May 21, 1935.  S. SMITH  2,002,100
SHOCK ABSORBER
Filed June 27, 1932  2 Sheets-Sheet 1
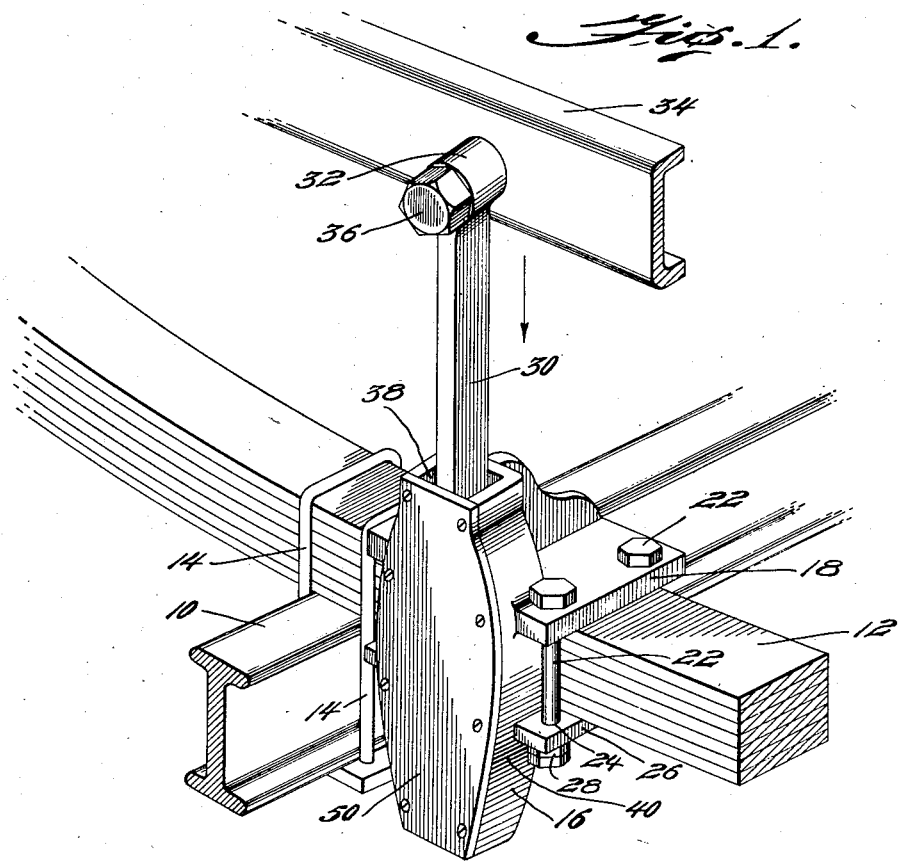
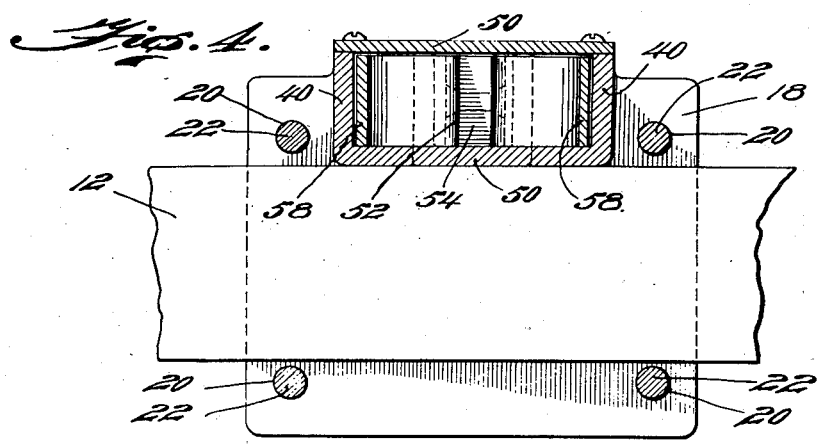
Inventor
Sheffield Smith
By Thomas A. Jurches
Attorney

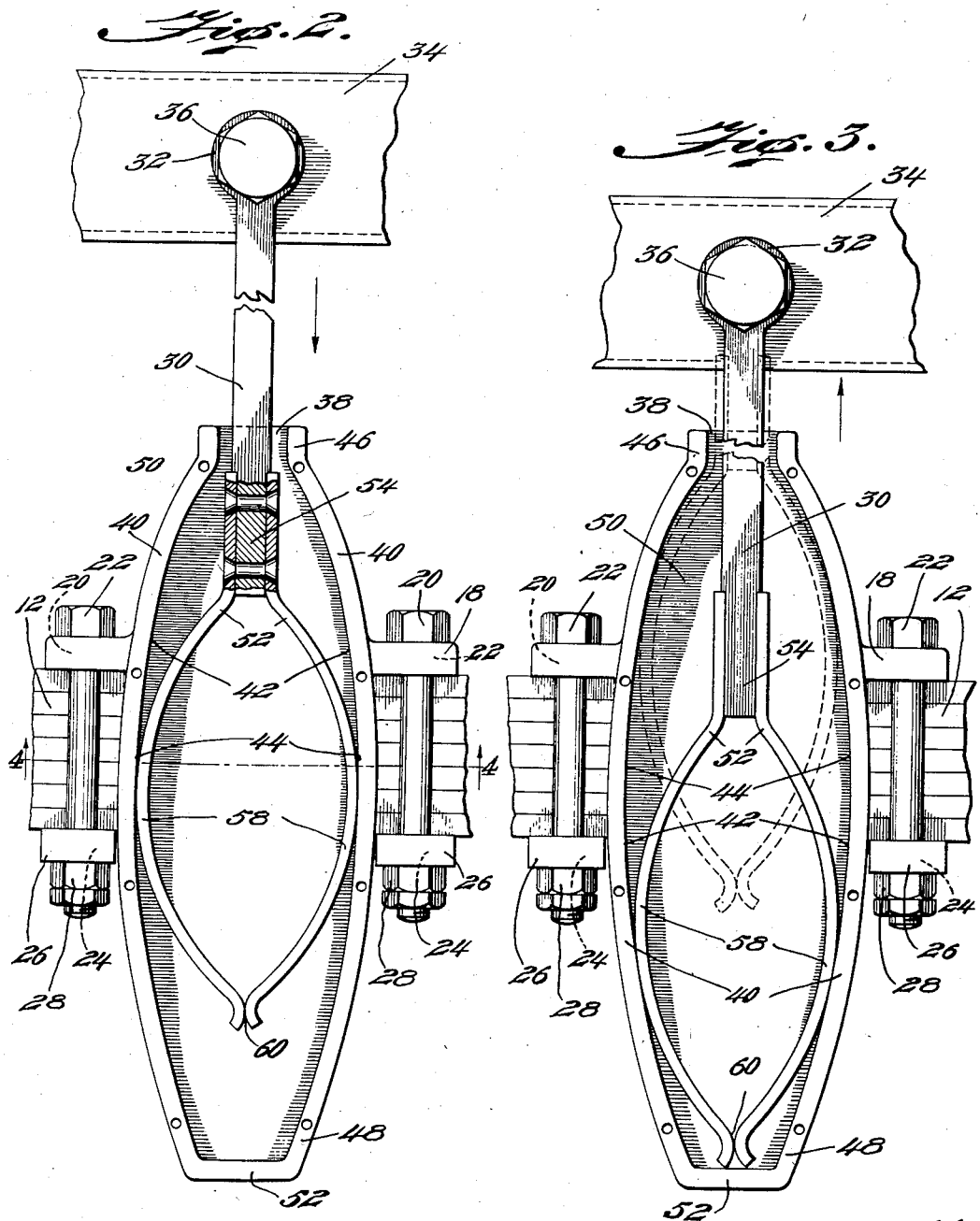

Patented May 21, 1935

2,002,100

UNITED STATES PATENT OFFICE 2,002,100

SHOCK ABSORBER

Sheffield Smith, North Providence, R. I.

Application June 27, 1932, Serial No. 619,408

2 Claims. (Cl. 267—9).

My invention relates to improvements in shock absorbers adapted to be used on vehicles of all types. My invention includes a plunger member attachable to a vehicle portion and a casing attachable to another vehicle portion containing the opposite plunger end and with the casing so shaped as to have the opposite sides thereof inclined from the center to the ends thereof, preferably being elliptically concaved for this purpose and with the lower end of the plunger contained within said casing having resilient wedge means therein adapted to reciprocate up and down within said casing and to contract on the upward movement thereof between the inclined upper portions of the opposite walls thereof and on the lower movement between the inclined lower portions of the opposite walls thereof; the inclined portions thus limiting the up and down movement of the resilient wedge member of my device. I preferably construct the resilient wedge member in the form of a double elliptical spring having a free lower end composed of two oppositely disposed convex leaves and of a slightly greater width than the center portion of the casing walls. Employing elliptical springs it is obvious that I have provided a construction which may be readily compressed, yet one practically impossible to pull out through the open end of the casing. With this construction it is apparent that an object of my invention is to provide a shock absorber which will function both on the up and down jolts, particularly on the up jolt and due to the relative movement between the free lower ends of the elliptical spring to provide an equalizing movement against angular shocks or bumps.

A further object of my invention is to gradually intensify the degree of resistance to the shock as the relatively movable parts of the vehicle approach the limits of their travel towards or away from each other.

A further feature of my invention is to provide a shock absorber which may be built with a minimum amount of space and constructed of a relatively small number of simple and easily manufactured parts.

These and such other objects of my invention as may hereinafter appear will be best understood from a description of the accompanying drawings, which illustrate an embodiment thereof.

In the drawings, Fig. 1 is a perspective view of my device applied to a vehicle.

Fig. 2 is a side elevation of my improved shock absorber with one of the side walls of the casing removed to show the parts in neutral position with the sides of the double elliptical spring abutting the inner surfaces of the end walls of the elliptical casing.

Fig. 3 is a similar view of the same showing the plunger in full lines in its extreme lower position and in dotted line in its extreme upper position.

Fig. 4 is a transverse section taken upwards through the line 4—4 of Fig. 2.

In the drawings, wherein like characters of reference indicate like parts throughout, 10 generally indicates a vehicle axle, on which is suitably mounted a usual vehicle leaf spring 12 suitably secured thereto by the clamps 14. I preferably mount the casing 16 of my invention on said leaf spring 12 in rear of said axle 10. For this purpose the casing 16 is provided with the flange 18 projecting laterally therefrom having the bolt holes 20 therein through which the bolts 22 are adapted to project downwardly straddling said spring through the bolt holes 24 of a clamping plate 26 extending underneath said spring 12 and be secured thereto by the nuts 28. It is obvious that with this construction I have firmly secured the casing to a vehicle supporting part, although it is obvious that the casing may be mounted on the axle 10 or on any other desired portion of the vehicle. My improved shock absorber includes not only the casing 16, but also the plunger member 30, in the embodiment shown having the upper end 32 adapted to be secured to a vehicle part 34, which has movement relative to the vehicle part 10 or 12, by means of the bolt 36 or otherwise. Said plunger extends downwards through the hole 38 in the top of the casing 16.

My improved shock absorber therefore comprises a casing 16 adapted to be mounted on the vehicle supporting part 12 having oppositely disposed walls, in the embodiment shown the oppositely disposed end walls 40 having inner surfaces 42 inclined from the center 44 thereof to the top end 46 thereof and to bottom end 48 thereof, in my preferred embodiment said inner surfaces 42 being preferably laterally concaved to form an elliptical concavity in said casing extending from the top 46 thereof to the bottom 48 thereof. In the embodiment shown the side walls 50 of said casing are preferably flat. The casing may if desired be provided with the bottom wall 52.

As stated the plunger 30 has an upper end 32 adapted to be attached to a vehicle part 34 movable relative to said vehicle supporting part on which the casing 16 is mounted extending through a hole 38 in the top wall of said casing and having resilient wedge means 52 secured to the lower end 54 thereof. The resilient wedge means 52 is preferably of slightly greater width than the tapered or elliptical casing end walls 40 and is reciprocatable within said casing with the outer surfaces of said resilient wedge means 52 contacting said inner surfaces of said oppositely disposed elliptical casing end walls 40. In the preferred embodiment shown the resilient wedge means preferably comprises the double elliptical spring 52 provided with the convex leaves 58 preferably jointly of slightly greater width than the center portion of the casing and preferably having a free lower end 60 so that the ends of said leaves 58 may have movement relative to each other to cushion lateral or angular thrusts between the relatively movable parts of the vehicle. It is apparent that employing the construction of double elliptical spring that I have provided a strong construction and one which will not pull out of its elliptical casing with a very great pressure, and that by having the free lower end 60, the action of each individual leaf counteracts the action of the vehicle spring as it pulls in opposite directions. Each leaf of the opposed elliptical spring functions when there is an angular jolt of the shock absorber to act as a lever on the opposite leaf functioning against its end wall to cause it to act as a lever to equalize the shock and to immediately readjust the vertical position of the spring.

It is apparent that I have provided a construction particularly when the spacing of the leaves 58 is slightly greater than the width of the center portion of the casing, which due to the resilient structure of the wedge means 52 will permit it to contract as it reciprocates vertically up and down as shown in Fig. 3 from the larger ellipse shown in Fig. 2 to the constricted ellipse shown in Fig. 3 and that the compression of the elliptical spring or other resilient wedge means employed will tend to ease and cushion the shock in either direction, the rebound from the shock tending to send the spring back to the neutral position shown in Fig. 2 and the action of the elliptical spring tending to cause the leaves to expand from the contracted positions shown in Fig. 3 near the top and bottom respectively of the casing to automatically return itself to the mid position shown in Fig. 2, thereby automatically tending to return itself to the center portion of the casing after either an up or down shock. It is apparent therefore, that I have provided a novel type of shock absorber functioning equally to take up either the up or down shocks, to equalize the shocks and return itself to a mid position and constructed of a relatively small number of simple working parts.

It is understood that my invention is not limited to the specific embodiment shown and that various deviations may be made therefrom without departing from the spirit and scope of the appended claims.

What I claim is:

1. In a shock absorber, a casing adapted to be mounted on a vehicle supporting part having end walls having the inner surfaces thereof vertically concaved to form an elliptical concavity in said casing, a plunger having an upper end adapted to be attached to a vehicle part movable relative to said vehicle supporting part extending through the top wall of said casing and having two oppositely disposed hemi-elliptical spring leaves secured to each side of the lower end thereof, concave side outermost, each having an outwardly bent lower end and having the lower end of the elliptical portion thereof slidably contacting the opposite hemi-elliptical spring portion to form an elliptical spring of slightly greater width than the distance between the elliptical casing end walls, reciprocatable within said casing against said oppositely disposed elliptical casing end walls and having a free lower end adapted to permit relative movement between the lower ends of said hemi-elliptical springs.

2. In a shock absorber, a casing adapted to be mounted on a vehicle supporting part having end walls having the inner surfaces thereof vertically concaved to form an elliptical concavity in said casing, a plunger having an upper end adapted to be attached to a vehicle part movable relative to said vehicle supporting part extending through the top wall of said casing and having two oppositely disposed hemi-elliptical spring leaves secured to each side of the lower end thereof concave side outermost, each having an outwardly bent lower end and having the lower end of the elliptical portion thereof contacting the opposite hemi-elliptical spring portion to form a complete elliptical spring of slightly greater width than the distance between the elliptical casing end walls, reciprocatable within said casing against said oppositely disposed elliptical casing end walls.

SHEFFIELD SMITH.